United States Patent Office 3,435,308
Patented Mar. 25, 1969

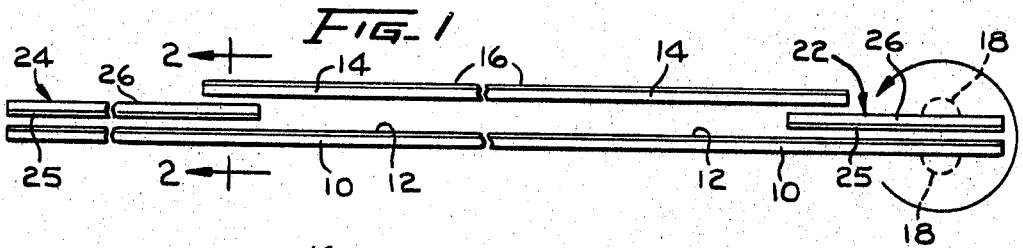
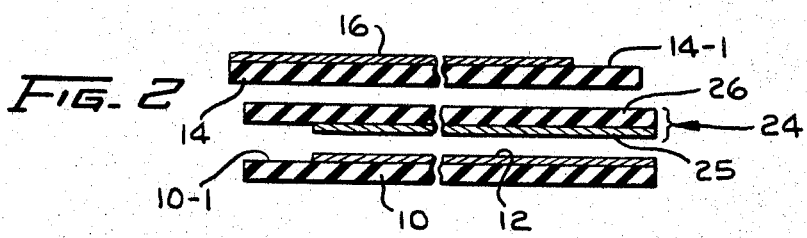
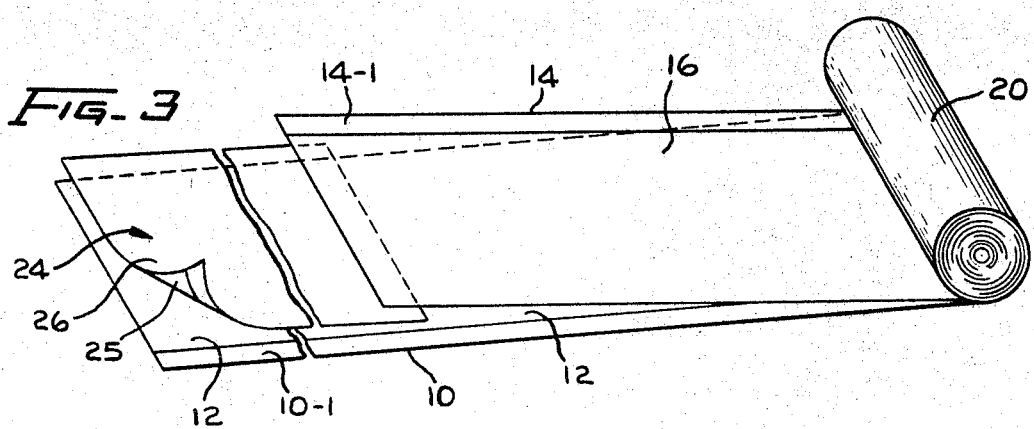
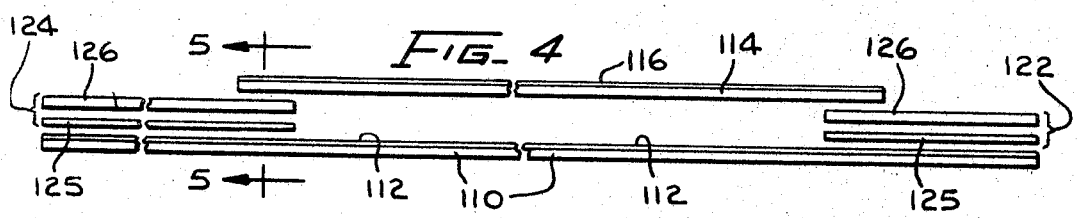
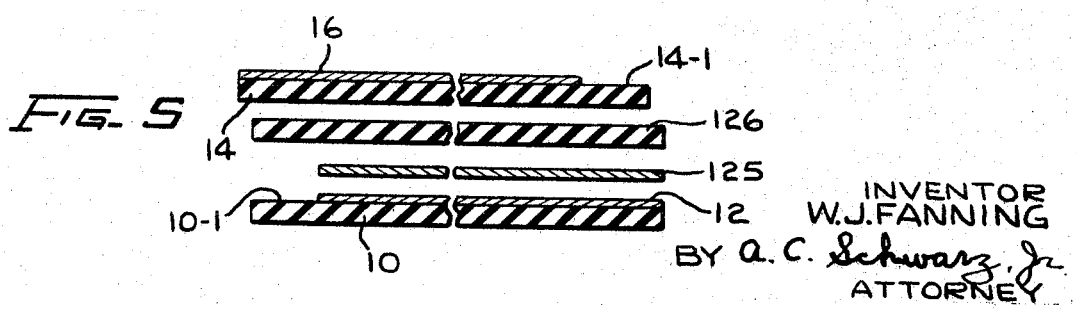
INVENTOR
W. J. FANNING
BY A. C. Schwarz, Jr.
ATTORNEY March 25, 1969 W. J. FANNING 3,435,308
METALLIZED CAPACITOR WITH MOISTURE BARRIER
Filed May 26, 1967

3,435,308
METALLIZED CAPACITOR WITH MOISTURE BARRIER
William J. Fanning, Melrose Park, Ill., assignor to Western Electric Company, Incorporated, New York, N.Y., a corporation of New York
Filed May 26, 1967, Ser. No. 641,515
Int. Cl. H01g 1/10, 3/215
U.S. Cl. 317—260          5 Claims

ABSTRACT OF THE DISCLOSURE

A self-healing capacitor is wound from a pair of elongated metallized webs during which an insert consisting of a dielectric web and a layer of metal on one surface thereof is interposed between the trailing end portions of the metallized webs and wound therewith through at least one convolution, the metal layer serving to resist the penetration of moisture into the capacitor.

BACKGROUND OF THE INVENTION

Field of the invention

This invention relates to metallized capacitors, and more particularly to metallized capacitors constructed so as to provide an effective barrier against moisture.

Description of the prior art

As is well known moisture has an adverse effect on capacitors during their operation and shortens the life expectancy thereof. In the field of self-healing metallized capacitors, it has been found that resistance to moisture can be greatly improved by increasing the thickness of the electrode metallized onto the dielectric webs of the capacitor. However, difficulties are encountered in applying heavy metallized electrodes onto thin dielectric webs. In addition the capacitors which are made from dielectric webs having relatively heavy electrodes metallized thereon and which are cleared subsequent to the winding of the capacitor in accordance with the teaching of the prior art, have a relatively high number of electrical faults which causes a high rate of rejection of the capacitors during a subsequent breakdown count test and sorting operation.

Accordingly, it is an object of the invention to provide an improved metallized capacitor having an effective moisture barrier.

SUMMARY OF THE INVENTION

A capacitor illustrating certain aspects of the invention is wound from a pair of elongated metallized webs during the winding of which an insert consisting of a dielectric web and a layer of metal is interposed between the trailing end portions of the pair of metallized webs and wound therewith through at least one complete turn, the metal layer serving as a barrier against radial penetration of moisture into the capacitor. The layer of metal may be either a film metallized onto the dielectric web insert, or a metal foil cooperating therewith. Subsequently, metallic terminals are sprayed onto the ends of the capacitor.

BRIEF DESCRIPTION OF THE DRAWINGS

Other objects, advantages and novel aspects of the invention will become apparent upon consideration of the following detailed description, in conjunction with the accompanying drawings, in which:

FIG. 1 is a diagrammatic side elevational view of the capacitor forming strips in unrolled and separated relation of a preferred embodiment of the invention;

FIG. 2 is a diagrammatic enlarged cross-sectional view through the capacitor forming strips taken on the line 2—2 of FIG. 1;

FIG. 3 is a perspective view of the capacitor forming strips partially wound into a capacitor roll and showing the relation of the moisture barrier insert relative to the metallized webs;

FIG. 4 is a side elevational view similar to FIG. 1 of the capacitor forming strips of a modified embodiment of the invention;

FIG. 5 is a cross-sectional view through the capacitor forming strips taken on the line 5—5 of FIG. 4;

DETAILED DESCRIPTION

Figure 6:
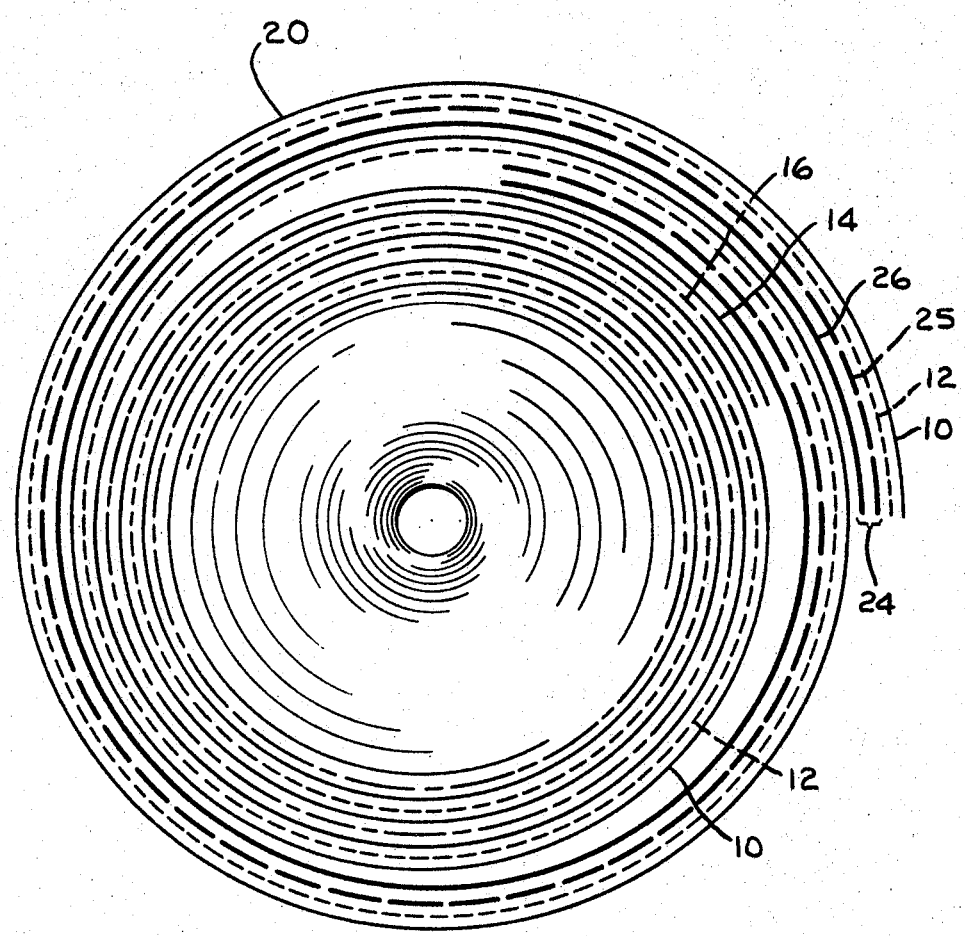
FIG. 6 is an enlarged diagrammatic end view of a wound capacitor roll showing the moisture resistant insert therein.
Figure 7:
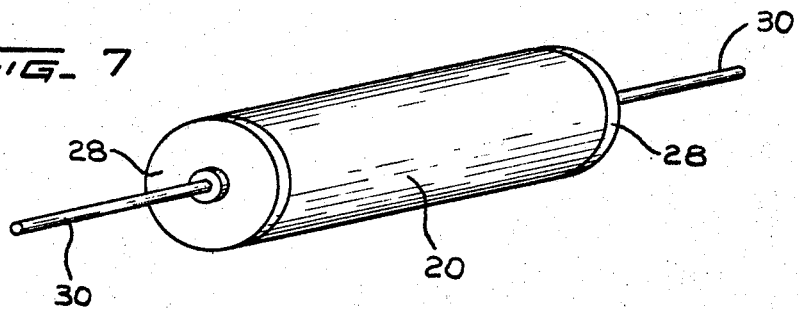
FIG. 7 is a perspective view of the capacitor with solder terminals sprayed onto the ends thereof.

Referring to the drawings the capacitor comprises a first elongated dielectric web 10 having an electrode 12 metallized on one face thereof, and a second elongated dielectric web 14 of the same width as that of the first and having an electrode 16 metallized on one face thereof. The electrodes 12 and 16 are of less width than that of the webs 10 and 14 and extend from one longitudinal edge thereof leaving a bare margin 10–1 and 14–1 of the web along the opposite edge thereof.

As viewed in FIGS. 1 and 2, the metallized webs 10 and 14 are disposed in superposed relation to each other with the bare margins 10–1 and 14–1, respectively, of the webs 10 and 14 disposed at opposite edges of the superposed webs and with the metallized webs offset laterally slightly with respect of each other so that on completion of the winding of the metallized webs into a capacitor roll, a slight marginal portion of each of the metallized electrodes is accessible at opposite ends of the capacitor roll. The metallized web 10 (FIG. 1) is longer than the web 14 and the trailing end thereof is adapted to be wound several times around the capacitor roll and sealed thereto.

The relatively thick film or coating of zinc 25 on the metallized tab 24 serves as an effective vapor barrier and prevents the passage of moisture radially into the capacitor roll 20. The tab 22 at the leading end of the capacitor forming strips provides an extended insulating layer between the electrodes 12 and 16.

On completion of the winding of the capacitor roll 20 molten solder is sprayed onto the ends thereof, respectively, in engagement with the electrodes 12 and 16 to form terminals therefor 28. Headed leads 30 may then be bonded to terminals 28.

In a modified embodiment of the invention shown in FIGS. 4 and 5, tab inserts 122 and 124, severed from a composite strip formed of superposed layers of an elongated dielectric web 126 and a metallic foil 125, are substituted for the tabs 22 and 24 of the other embodiment. The tabs 122 and 124 are inserted, respectively, between the leading end portions and the trailing end portions of the pair of elongated metallized webs 110 and 114 during the winding of the capacitor roll. The metal foil 125 of the tab insert 124 encircles the capacitor through several convolutions, and the relationship of the dielectric web 126 and the foil 125 except for the thickness of the latter is substantially the same as that of the dielectric web 26 and the metallized layer 25 of the tab 24 of the preferred embodiment of the invention. With the use of a tab 124 having a separate foil 125 the thickness of the foil may be varied as needed to provide an effective vapor barrier for the capacitor.

From the above disclosure it will be evident that a novel capacitor structure has been provided having a separate layer or film of metal encircling the capacitor adjacent the outer periphery thereof and interleaved with the capacitor forming strips and offering effetcive resistance to the penetration of moisture into the capacitor.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A capacitor having a moisture barrier which comprises:
   a pair of elongated dielectric webs each having an electrode metallized on one face thereof and convolutely arranged in a capacitor roll with said electrodes in superposed and insulated relation to each other;
   a metallic film convolutely arranged around the trailing end portion of at least one of the metallized webs and through at least one complete convolution of the capacitor roll to form a moisture barrier therefor; and means for supporting said metallic film in insulated relation to at least one of said metallized electrodes.

2. A capacitor as defined in claim 1 wherein said metallic film is a foil.

3. A metallized capacitor having a moisture barrier which comprises:
   a pair of elongated dielectric webs having, respectively, an electrode metallized on one face thereof and convolutely arranged in a capacitor roll with said electrode in superposed and insulated relation to each other;
   a metallic film interposed between the trailing end portions of the metallized webs and extending around the roll through at least one complete convolution to resist the passage of moisture therethrough; and means for supporting said metallic foil in insulated relation to at least one of said metallized electrodes.

4. A capacitor as defined in claim 3 wherein said metallic film comprises a foil.

5. A metallized capacitor which comprises:
   a pair of elongated dielectric webs having, respectively, an electrode metallized on one face thereof and convolutely arranged in a roll with the electrodes in superposed and insulated relation to each other and with the trailing end portion of one metallized web extending beyond and encircling the roll; and
   a relatively short third dielectric web having a metallic film metallized on one side thereof; said metallized third web being disposed in superposed relation to the trailing end portion of said one dielectric web and with the metallized surfaces thereof in aligned relation and abutting engagement with one another and arranged around the roll through at least one convolution and with a portion of said third metallized web overlying a portion of the other one of said pair of metallized webs and with the dielectric webs thereof in abutting engagement with one another.

References Cited

UNITED STATES PATENTS 971,667   10/1910   Dean _____ 317—260

FOREIGN PATENTS 425,745   3/1935   Great Britain.

OTHER REFERENCES

German printed application to Ericsson, No. 1,048,-355 in Class 317–250, published Jan. 8, 1959.

LEWIS H. MYERS, *Primary Examiner.*

E. A. GOLDBERG, *Assistant Examiner.*

U.S. Cl. X.R.

29—25.42